US012233665B2

(12) United States Patent
Wilson et al.

(10) Patent No.: US 12,233,665 B2
(45) Date of Patent: Feb. 25, 2025

(54) CHALK BOX WITH LINE LOCK ASSEMBLY

(71) Applicant: APEX BRANDS, INC., Apex, NC (US)

(72) Inventors: Cecil Wilson, Sanford, NC (US); Eric Van Fossen, Huntersville, NC (US)

(73) Assignee: APEX BRANDS, INC., Apex, NC (US)

(*) Notice: Subject to any disclaimer, the term of this patent is extended or adjusted under 35 U.S.C. 154(b) by 444 days.

(21) Appl. No.: 17/440,033

(22) PCT Filed: Mar. 19, 2020

(86) PCT No.: PCT/US2020/023605
§ 371 (c)(1),
(2) Date: Sep. 16, 2021

(87) PCT Pub. No.: WO2020/191185
PCT Pub. Date: Sep. 24, 2020

(65) Prior Publication Data

US 2022/0176733 A1 Jun. 9, 2022

Related U.S. Application Data

(60) Provisional application No. 62/820,532, filed on Mar. 19, 2019.

(51) Int. Cl.
*B44D 3/38* (2006.01)
*B65H 75/40* (2006.01)

(52) U.S. Cl.
CPC ............. *B44D 3/38* (2013.01); *B65H 75/406* (2013.01)

(58) Field of Classification Search
CPC .. B44D 3/38; B65H 75/406; B65H 2701/357; B65H 75/4431
See application file for complete search history.

(56) References Cited

U.S. PATENT DOCUMENTS 5,509,616 A * 4/1996 Millen, Jr. ............. B65H 75/44 242/385.4
5,822,874 A 10/1998 Nemes
(Continued)

FOREIGN PATENT DOCUMENTS

CN 1659044 A 8/2005
CN 202412275 U 9/2012
CN 203317415 U 12/2013

OTHER PUBLICATIONS

International Search Report and Written Opinion from related international application No. PCT/US2020/023605 mailed on Jul. 1, 2020, all pages enclosed cited in its entirety.
(Continued)

*Primary Examiner* — Yaritza Guadalupe-McCall
(74) *Attorney, Agent, or Firm* — BURR & FORMAN LLP

(57) ABSTRACT

A line lock assembly for locking a retraction assembly of a chalk box may include a line lock cover (250) operably coupled to a housing of the chalk box to form a line lock member enclosure, and a line lock member (260) disposed within the line lock member enclosure. The line lock member may be configured to move responsive to rotation of the line lock cover to alternately lock the retraction assembly and unlock the retraction assembly based on a position of the line lock cover.

17 Claims, 9 Drawing Sheets

(56) References Cited

U.S. PATENT DOCUMENTS

| | | | | |
|---|---|---|---|---|
| 6,789,329 | B1 * | 9/2004 | Hester | G01B 3/1084 33/760 |
| 7,260,899 | B2 * | 8/2007 | Jones | G01B 3/1041 33/760 |
| 7,311,283 | B2 | 12/2007 | Whitney | |
| D573,046 | S * | 7/2008 | Levinson | D10/70 |
| 7,536,799 | B2 * | 5/2009 | Nepil | B44D 3/38 33/414 |
| 8,713,810 | B2 * | 5/2014 | Spaulding | B44D 3/38 33/414 |
| 9,354,031 | B1 * | 5/2016 | Darr | G01B 3/1084 |
| 9,701,154 | B2 * | 7/2017 | Parker | B44D 3/38 |
| 10,071,594 | B2 * | 9/2018 | Chernyshou | B44D 3/38 |
| 10,583,687 | B2 * | 3/2020 | Fox | B44D 3/38 |
| 10,743,522 | B2 * | 8/2020 | Smith | B65H 75/4471 |
| 10,829,341 | B2 * | 11/2020 | Lai | B65H 75/4431 |
| 11,203,223 | B2 * | 12/2021 | Fox | B44D 3/38 |
| 11,541,684 | B2 * | 1/2023 | Hanley | B44D 3/38 |
| 11,554,605 | B1 * | 1/2023 | Fox | B44D 3/38 |
| 2004/0168335 | A1 * | 9/2004 | Pritchard | B44D 3/38 33/760 |
| 2006/0144985 | A1 * | 7/2006 | Whitney | B44D 3/38 242/395.1 |
| 2008/0040939 | A1 * | 2/2008 | Whitney | B44D 3/38 33/414 |
| 2020/0079616 | A1 * | 3/2020 | Lai | B65H 75/4431 |
| 2020/0369073 | A1 * | 11/2020 | Cemke, Jr. | B65H 75/406 |
| 2022/0176733 | A1 * | 6/2022 | Wilson | B65H 75/406 |
| 2022/0314687 | A1 * | 10/2022 | Wilson | B44D 3/38 |

OTHER PUBLICATIONS

Office Action from Chinese Application No. 202080021449X dated Jan. 24, 2022, all pages cited in its entirety.
Second Office Action issued in corresponding Chinese Application No. 202080021449.X on Aug. 16, 2022, all pages enclosed cited in its entirety.

* cited by examiner

CHALK BOX WITH LINE LOCK ASSEMBLY

CROSS-REFERENCE TO RELATED APPLICATIONS

This application claims the benefit of U.S. Provisional application No. 62/820,532, filed on Mar. 19, 2019, the entire contents of which are hereby incorporated by reference.

TECHNICAL FIELD

Example embodiments generally relate to a chalk box or chalk reel, and more particularly relate to a chalk box or chalk reel having a line lock assembly.

BACKGROUND

A chalk box (sometimes referred to as a chalk reel or chalk line tool) is a tool for marking straight lines on surfaces. To accomplish this, the chalk box typically includes a string or line that may be made of nylon, cotton or other materials and is able to be wound or spooled up onto a reel assembly. The string is exposed to chalk (or another marking substance) within the tool. The string typically has an end hook at one end, and the end hook extends from a body of the tool. The end hook can be pulled, thereby extracting string from the reel assembly, to place the end hook at a first point that is distant from a second point near which the remainder of the tool will be retained. Alternatively, the end hook could be affixed to the first point and the remainder of the tool can be moved to the second point while withdrawing string from the reel assembly. In either case, the end hook retains the string at the first point, and the user may pull the string relatively tightly to the second point (e.g., holding the string at the second point with the user's hand or thumb). The user may then pluck or snap the string sharply, and the chalk may be transferred to the surface to mark a straight line between the first and second points. The marked line is often referred to as a chalk line and, after its formation, the user often operates a rotatable handle that is operably coupled to the reel assembly to retract the string back onto the reel or drum thereof.

The process described above, and the tool adapted for performing the process, are both very old. Thus, various aspects of the design of the tool have remained relatively unchanged for a long time as well. Accordingly, it may be desirable to define various improvements to the design of a chalk box that may, for example, both improve the aesthetic appearance of the chalk box and also improve the functional capabilities or performance of the chalk box.

BRIEF SUMMARY OF SOME EXAMPLES

Some example embodiments may enable the provision of a chalk box that has an improved line lock assembly, which is both functionally and aesthetically superior to prior designs of the chalk box.

In an example embodiment, a chalk box is provided. The chalk box may include a housing having an aperture, a reel assembly enclosed within the housing, a string, a chalk reservoir and a line lock assembly. The string may have a first end operably coupled to an end hook and configured to extend from the housing through the aperture and may have a second end operably coupled to the reel assembly. The chalk reservoir may be a space in which the string is retained or through which the string passes prior to extending out of the aperture. The retraction assembly may be configured to interface with the reel assembly to enable the string, after extension from the housing, to be wound on the reel assembly responsive to operation of the retraction assembly. The line lock assembly may be configured to lock the retraction assembly to prevent winding or unwinding of the string. The line lock assembly may include a line lock member disposed in a line lock member enclosure.

In another example embodiment, a line lock assembly for locking a retraction assembly of a chalk box is provided. The line lock assembly may include a line lock cover operably coupled to a housing of the chalk box to form a line lock member enclosure, and a line lock member disposed within the line lock member enclosure. The line lock member may be configured to move responsive to rotation of the line lock cover to alternately lock the retraction assembly and unlock the retraction assembly based on a position of the line lock cover.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 2:
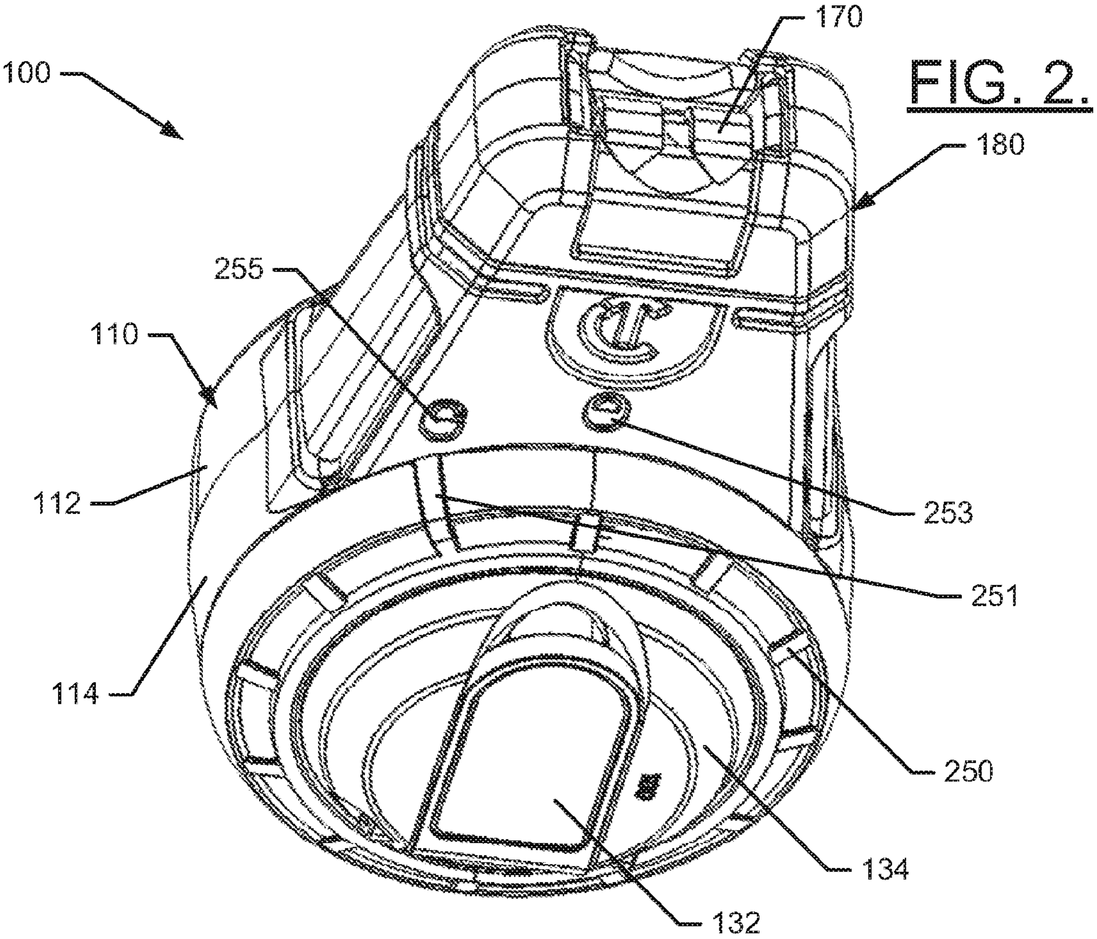
FIG. 2 illustrates a front perspective view of the chalk box in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
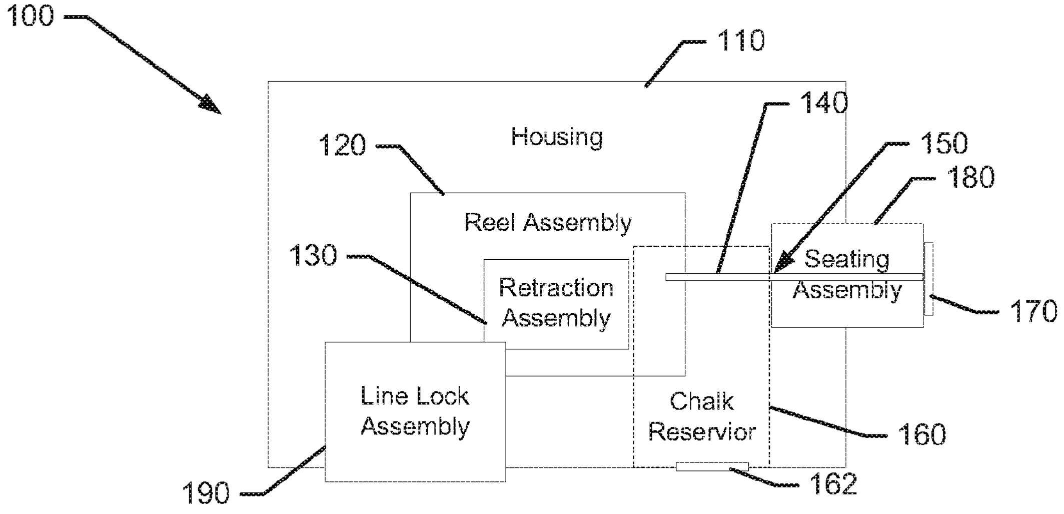
FIG. 1 illustrates a block diagram of a chalk box in accordance with an example embodiment.
Figure 3:
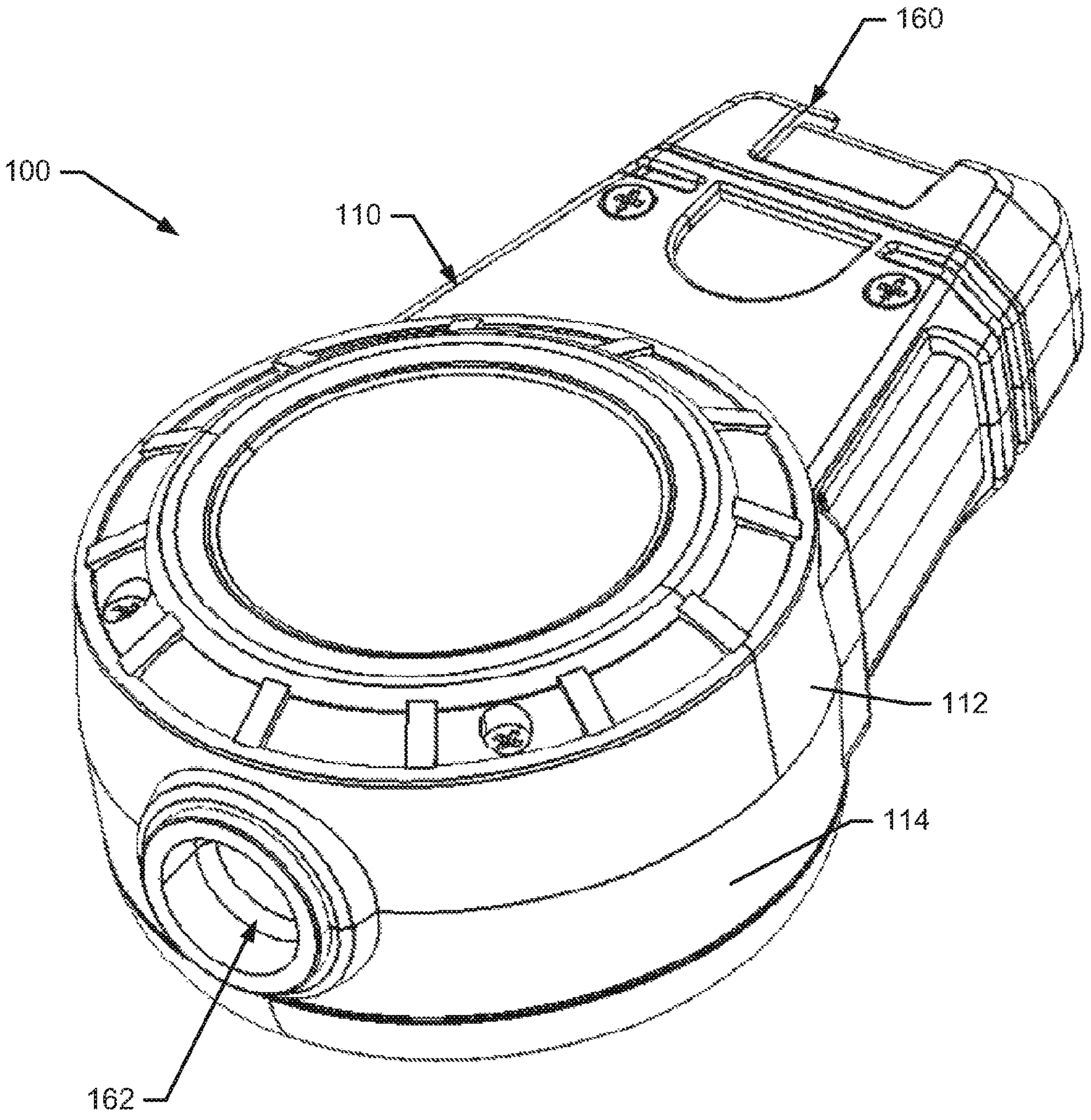
FIG. 3 illustrates a rear perspective view of the chalk box in accordance with an example embodiment.
Figure 4:
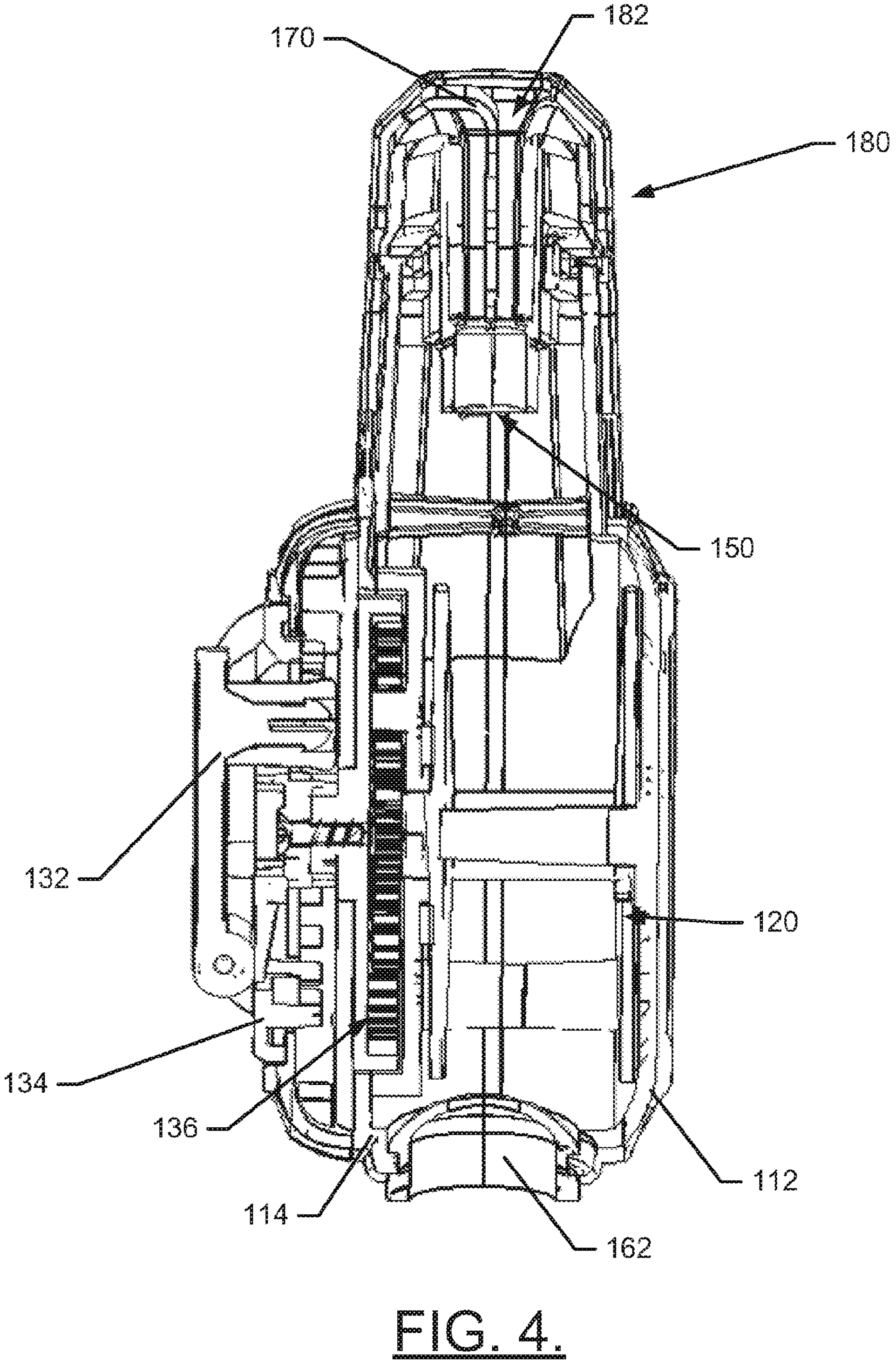
FIG. 4 is a cross section view taken along a longitudinal centerline of the chalk box via a plane that is perpendicular to a plane that separates housing portions of the chalk box in accordance with an example embodiment.
Figure 5A:
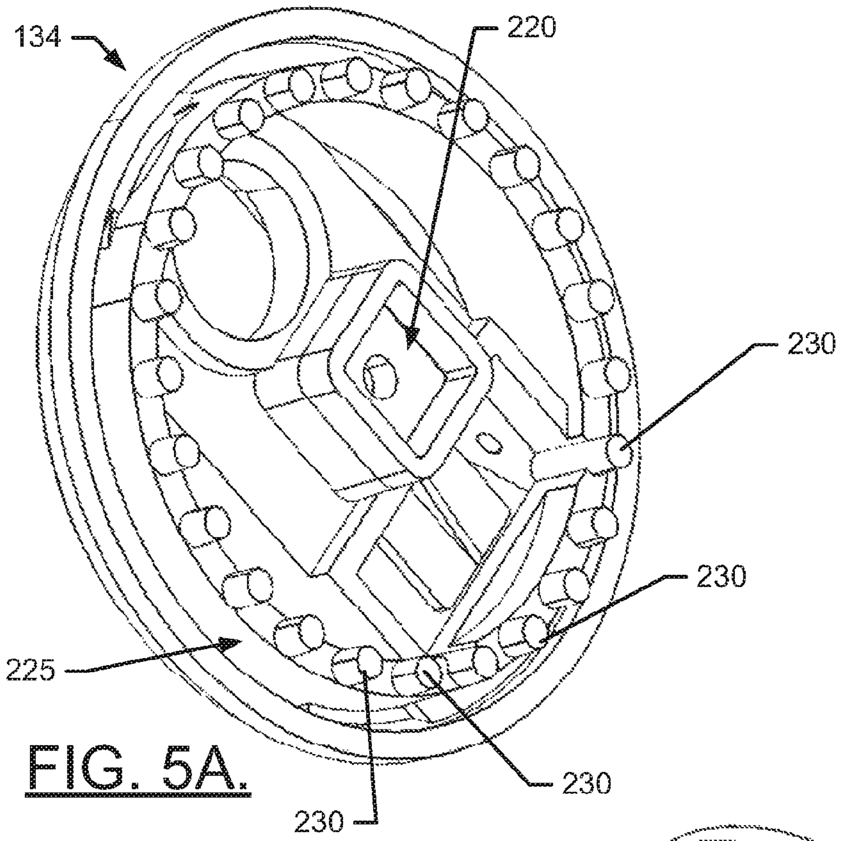
FIG. 5A illustrates back perspective view of a hub of a retraction assembly in accordance with an example embodiment.
Figure 5B:
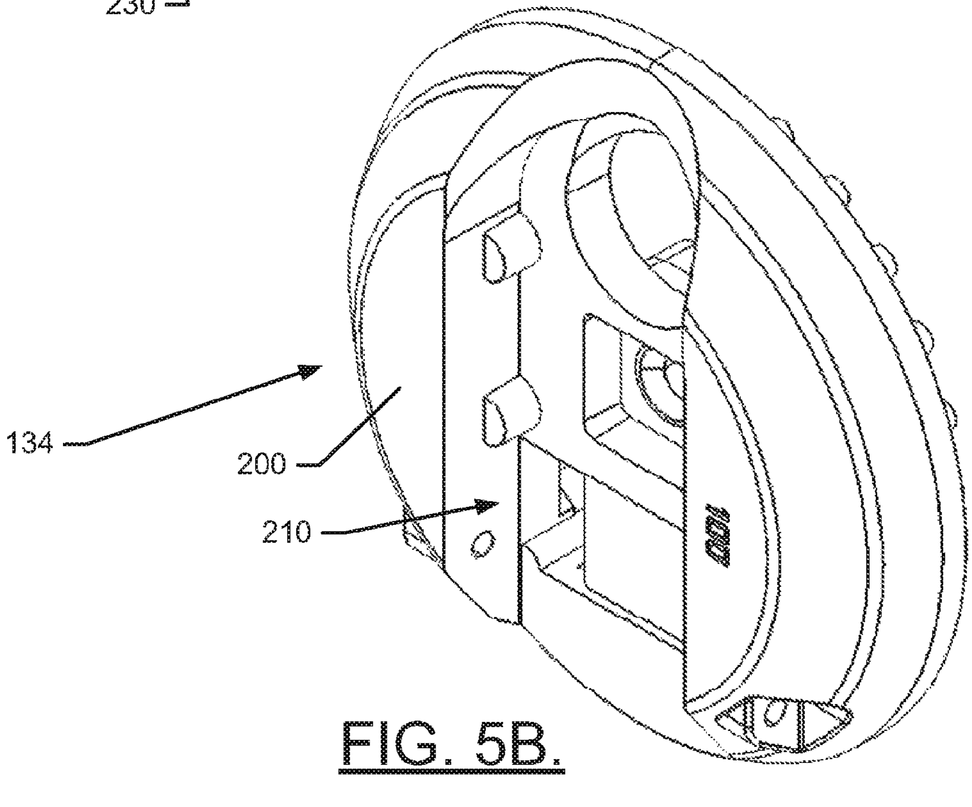
FIG. 5B illustrates front perspective view of the hub of the retraction assembly in accordance with an example embodiment.
Figure 6:
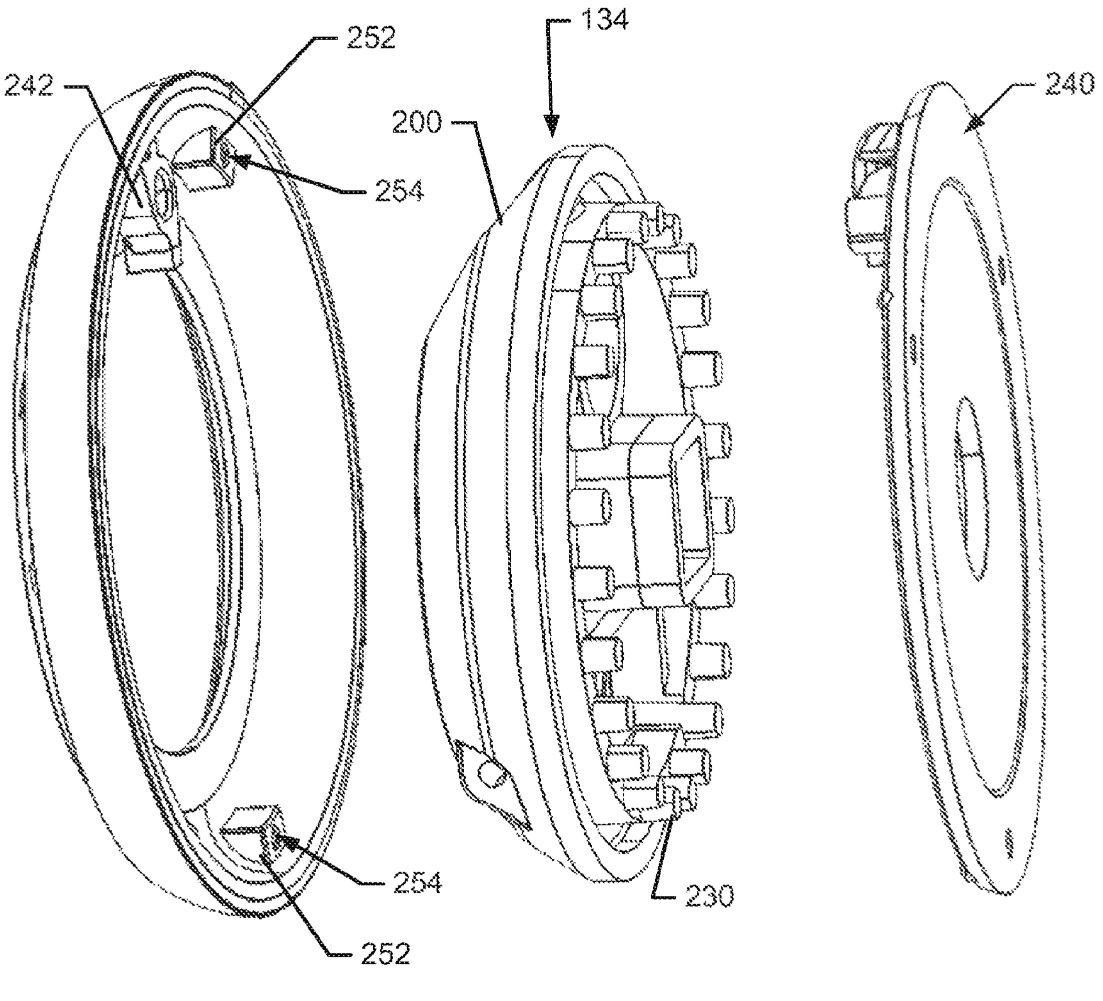
FIG. 6 is an exploded perspective view of the hub and components of the line lock assembly in accordance with an example embodiment.
Figure 7A:
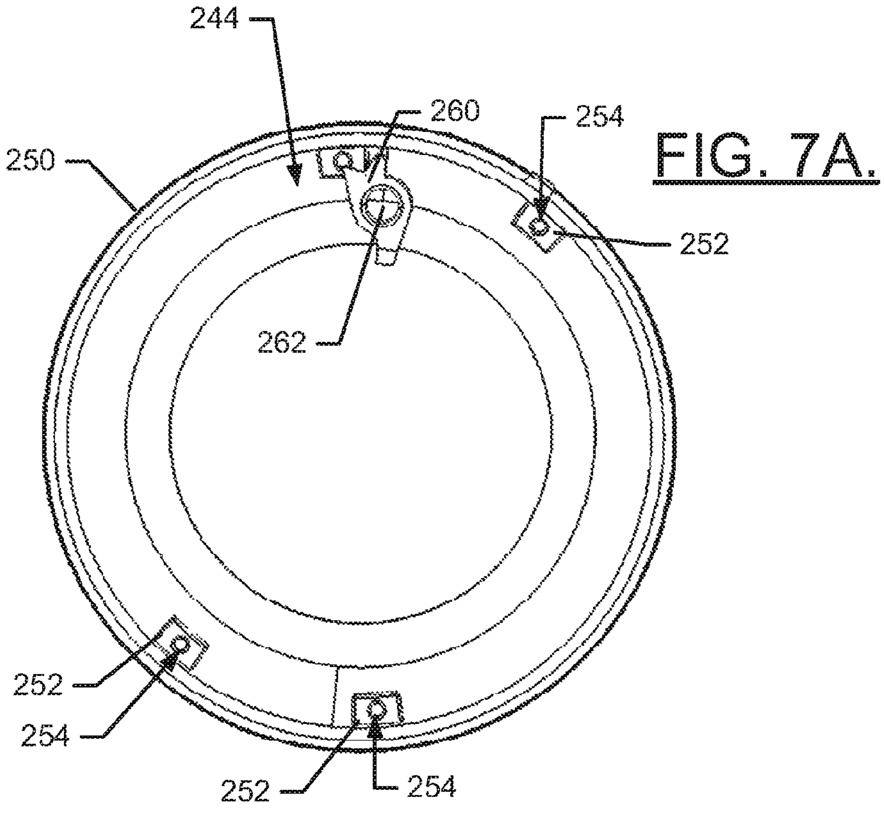
FIG. 7A illustrates a back view of a line lock cover in accordance with an example embodiment.
Figure 7B:
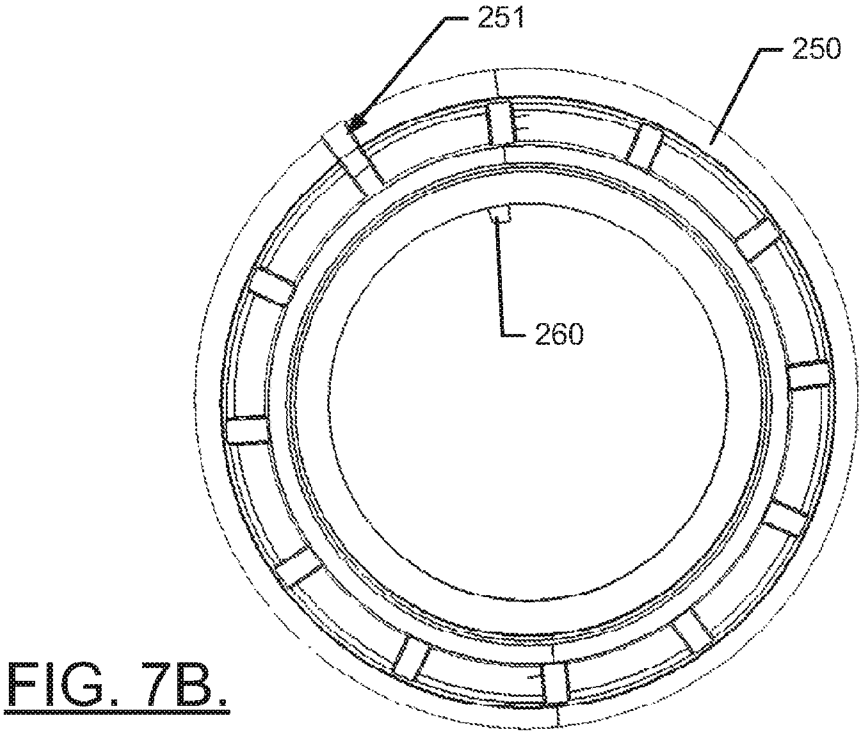
FIG. 7B illustrates a front view of the line lock cover in accordance with an example embodiment.
Figure 8A:
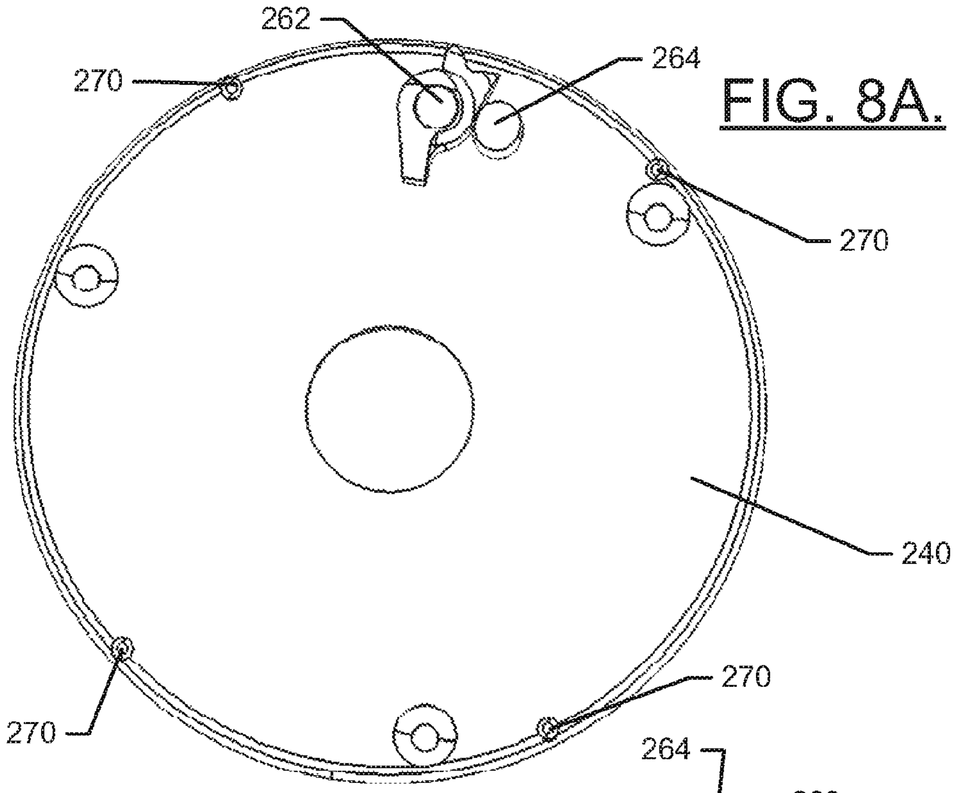
FIG. 8A illustrates a front view of the line lock lever and retaining plate in accordance with an example embodiment.
Figure 8B:
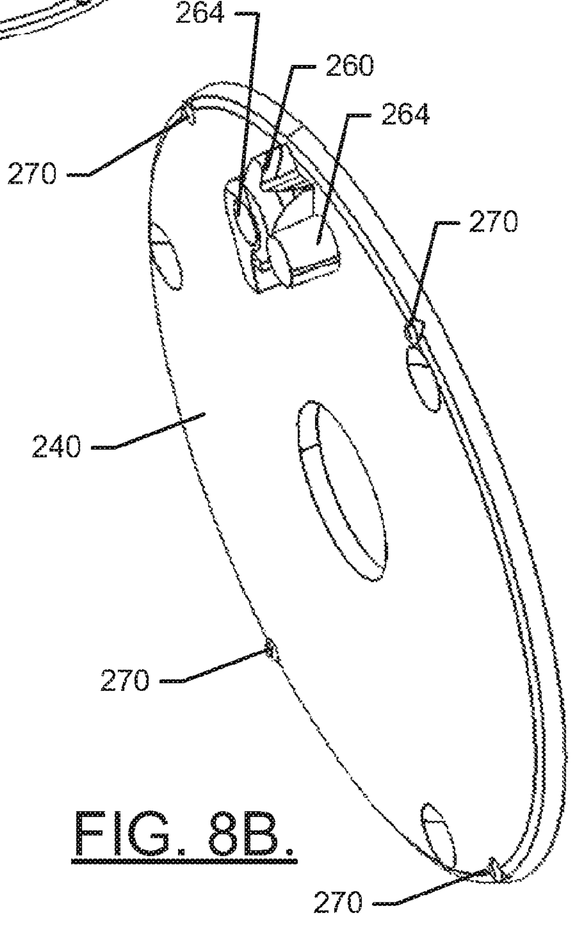
FIG. 8B illustrates a perspective view of the line lock lever and retaining plate in accordance with an example embodiment.
Figure 9A:
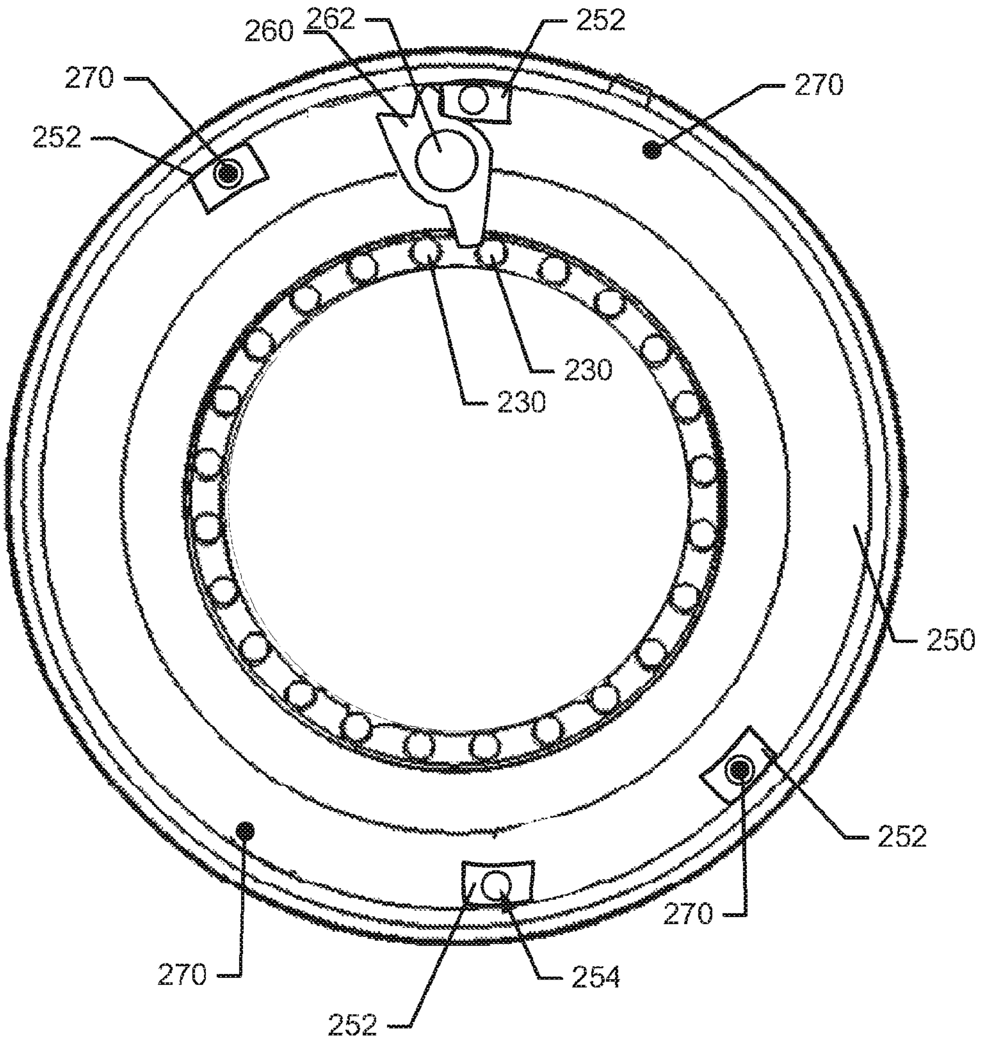
FIG. 9A illustrates the locking assembly in a locked configuration or state in accordance with an example embodiment.
Figure 9B:
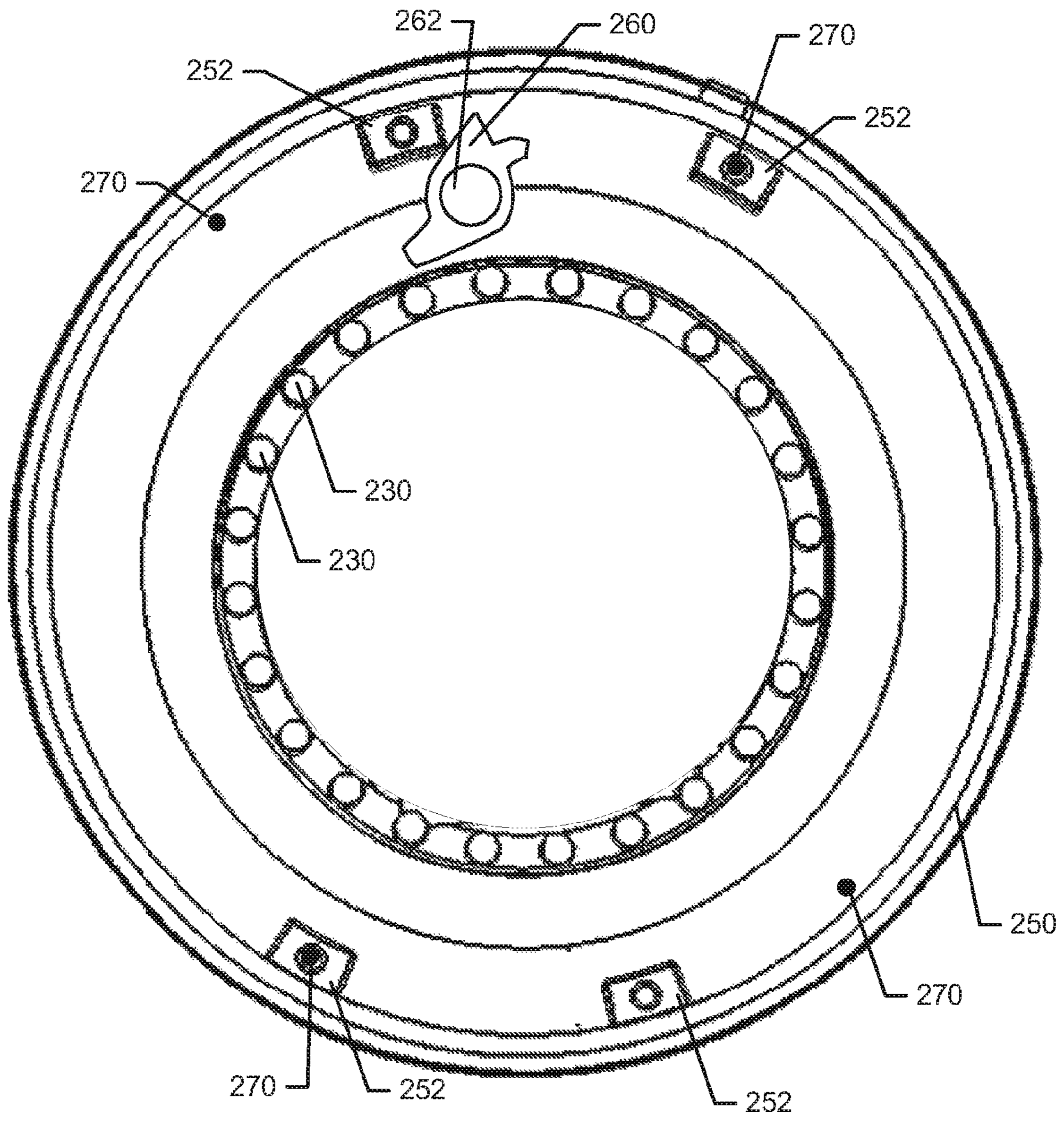
FIG. 9B illustrates the locking assembly in an unlocked configuration or state in accordance with an example embodiment.

As indicated above, some example embodiments may relate to the provision of a chalk box that may have an improved design for a line lock assembly. This may be accomplished by providing the line lock lever within a line lock lever enclosure as described herein. The resulting device is both sleek looking in appearance and also superior in performance since the line lock lever cannot be damaged due to snagging or bumping external objects, and is also not exposed to impact damage and wear. FIG. 1 illustrates a block diagram of a chalk box 100 in accordance with an example embodiment, and FIGS. 2 and 3 illustrate front and rear perspective views, respectively, of the chalk box. FIG. 4 illustrates a cross section view taken along a plane perpendicular to the intersection between case halves of the chalk box. FIG. 5, which is defined by FIGS. 5A and 5B, illustrates back and front perspective views of a hub of the retraction assembly. FIG. 6 is an exploded perspective view of the hub and components of the line lock assembly. FIG. 7, which is defined by FIGS. 7A and 7B, illustrates back and front views of the line lock cover. FIG. 8, which is defined by FIGS. 8A and 8B, illustrates a front view and a perspective view of the line lock lever and retaining plate. FIG. 9, which is defined by FIGS. 9A and 9B illustrates the locking assembly in a locked configuration or state and unlocked configuration or state, respectively.

Referring now to FIGS. 1-9, a chalk box 100 of an example embodiment may include a housing 110 comprising a first case half 112 and a second case half 114. The first and second case halves 112 and 114 may house a reel assembly 120 and a retraction assembly 130 therein. A string 140 (or line) may be wound onto the reel assembly 120 and may be alternately withdrawn from and retracted back onto the reel assembly 120. The retraction back onto the reel assembly 120 may be accomplished via the retraction assembly 130, which may include a foldable handle 132 that is folded in to nest into a portion of a hub 134 that is operably coupled to the second case half 114. The handle 132 can be folded out in order to enable the user to turn the handle 132. When the handle 132 is folded out and turned, the hub 134 also rotates and is operably coupled to a gear assembly (see gear assembly 136 of FIG. 4) that may provide multiple rotations of a drum or reel of the reel assembly 120 for each respective rotation of the handle 132.

The string 140 may be paid out through an aperture 150 formed in a portion of the housing 110. The aperture 150 may be formed to be slightly larger than a diameter of the string 140, and may further house or retain a filter or wiping member, such as a piece of felt or other material that prevents excess escape of chalk from a chalk reservoir 160 that is exposed to the string 140 while the string 140 is inside the housing 110, and also removes excess chalk from the string 140 as the string 140 is withdrawn from the housing 110. The felt may be held in place by a retaining wire or other structure. The string 140 may therefore pass through or be retained in the chalk reservoir 160 before passing out the aperture 150. In an example embodiment, the chalk reservoir 160 may include a plug 162 that is accessible from outside the housing 110 to be removed to enable refilling of the chalk reservoir 160. The plug 162 of this example is located at a bottom portion of the housing 110, but other locations for the plug 162 are also possible.

The string 140 has an end hook 170 disposed at one end thereof, and is affixed to the reel assembly 120 at the other end of the string 140. The end hook 170 may be affixed (temporarily) to an anchor point on a medium or surface that is to be marked. Once the end hook 170 is affixed to the anchor point, the string 140 may be paid out of the aperture 150 and unwound from the reel assembly 120. When a desired length of the string 140 has been paid out, the user can make any necessary markings by snapping or plucking the string 140 as described above. The end hook 170 may then be released from the anchor point, and the handle 132 may be used to operate the retraction assembly 130 to wind the string 140 back onto the reel assembly 120 by drawing the string 140 back into the housing 110 via the aperture 150.

As noted above, the user typically has to hold or pinch a portion of the string 140 near the chalk box 100 to keep the string 140 taut to permit plucking or snapping. However, in some example embodiments, the chalk box 100 may further include a line locking assembly 190. The line locking assembly 190 may be provided to enable the string 140 to be locked (e.g., by preventing rotation of the hub 134) to prevent the string 140 from retracting from the housing 110 when the line locking assembly 190 is engaged or in a locked state or configuration. Meanwhile, when the line locking assembly is shifted to the unlocked state or configuration, the line locking assembly is disengaged from the hub 134 and the hub 134 is free to turn with the handle 132.

By fixing the end hook 170 to the anchor point and engaging the line locking assembly 190 (i.e., shifting the line locking assembly 190 to the locked state), the retraction assembly 130 may be prevented from moving, thereby also locking the reel assembly 120 so that no string 140 can be either paid out or retracted relative to the reel assembly 120. Thus, the user can simply hold the housing 110 of the chalk box 100 in order to keep the string 140 taut and enable plucking or snapping to mark a chalk line. The line locking assembly 190 can then be unlocked or disengaged in order to permit retracting the paid out portions of the string 140 into the housing 110 (via the aperture 150). Similarly, when the line locking assembly 190 is disengaged, longer portions of the string 140 could be paid out off of the reel assembly 120.

The specific structures used to lock or unlock the line locking assembly 190 could vary. Thus, it should be appreciated that FIGS. 5-9 illustrate one example structure that could be employed in connection with an example embodiment. In this regard, as shown in FIG. 5, the hub 134 may include a main body 200 having a reception cavity 210 formed therein on a front face of the main body 200. The handle 132 may fit in the reception cavity 210 when folded inward to be stored. A rear face of the hub 134 may include a coupling member 220 that is configured to be operably coupled to one of the gears of the gear assembly 136 (see FIG. 4), and therefore indirectly operably coupled to the reel assembly 120 such that one turn of the hub 134 causes multiple turns of the reel assembly 120 as mentioned above. The rear face may also include a support ring 225 disposed slightly inset from the outer periphery of the hub 134. The support ring 225 may include a plurality of spokes 230 that may be spaced evenly apart from each other and extend rearward (e.g., parallel to an axis of the hub 134 and the reel assembly 120).

In an example embodiment, the hub 134 may fit between a retaining plate 240 and a line lock cover 250 and may be enabled to freely spin 360 degrees within the space defined between the retaining plate 240 and the line lock cover 250 when the line lock assembly 190 is in an unlocked state. As shown in FIG. 2, the line lock cover 250 may include a state indicator 251, which may be a colored, textured, or otherwise distinctive marking on the outer surface of the line lock cover 250. As will be discussed in greater detail below, the line lock cover 250 may be rotatable to move the state indicator 251 to point to or align with a locked state marking 253 or an unlocked state marking 255. In an example embodiment, a range of motion of the line lock cover 250 may be limited to the range of motion necessary to enable rotation of the line lock cover 250 so that the state indicator 251 can point to or align with the locked state marking 253 at one extreme end of the range of motion, and point to or align with the unlocked state marking 255 at the opposite extreme end of the range of motion. The line lock cover 250 may include texturing or features on its surface that enable the user to grasp the line lock cover 250 more easily to facilitate such rotation.

Rotation of the line lock cover 250 may not only provide the indication of the state of the line lock assembly 190 (e.g., locked or unlocked), but may also cause the state change to be effectuated as well. In this regard, the rotation of the line lock cover 250 may cause movement of a line lock lever 260 that is enclosed by the line lock cover 250. In some cases, the line lock lever 260 may be disposed within a line lock lever enclosure that is formed between the retaining plate 240 and the line lock cover 250. The line lock lever enclosure may sit next to the spokes 230 so that the line lock lever 260 can rotate into and out of contact with the spokes 230 to alternately lock and unlock the line lock assembly 190, respectively.

In an example embodiment, the line lock lever 260 may be anchored to a post 262 that extends between and from either or both of the retaining plate 240 and the line lock cover 250. A movement limiting post 264 may also be provided adjacent to and spaced apart from the post 262 in order to limit motion of the line lock lever 260 when it rotates between the locked state and the unlocked state, as described herein. In particular, the line lock cover 250 may interface with the retaining plate 240 to limit the range of motion of the line lock cover 250 to move between the positions associated with the locked state and the unlocked state. Meanwhile, the movement of the line lock cover 250 may cause interaction between the line lock cover 250 and the line lock lever 260 between a locking position (where the line lock lever 260 is inserted into a space between two spokes 230 to block movement of the hub 134) and an unlocked position (where the line lock lever 260 does not block movement of the hub 134 due to the line lock lever 260 not being disposed between any spokes 230).

It should be appreciated that the line lock lever 260 is merely one example of a line lock member that may be used to execute example embodiments. Thus, for example, the line lock member could alternatively be a sliding member or any other structure that is capable of being rotated, slid or otherwise moved into and out of a locking position as described herein. If a sliding member is used, the line lock cover 250 may rotate to cause the line lock member to slide into the space between adjacent spokes 230 as described above, or may otherwise lock the hub 134 by sliding into a locking position relative to movement of the hub 134.

The line lock cover 250 may include extrusions 252 formed on an inside thereof (i.e., facing the retaining plate 240). Each of the extrusions 252 may extend toward the retaining plate 240 and may be configured to slide (or nearly slide) over the surface of the retaining plate 240 when the line lock cover 250 is rotated. Each of the extrusions 252 may further include a catch space 254 oriented toward the retaining plate 240 and surrounded on all lateral sides by the extrusions 252. Meanwhile, the retaining plate 240 may be a substantially flat and circular, plate shaped member with a smooth surface oriented toward the line lock cover 250 and the hub 134. The spokes 230 of the hub 134 may slide or nearly slide over a surface of the retaining plate 240 in some cases. As noted above, the extrusions 252 may also slide or nearly slide over the surface of the retaining plate 240 in some cases.

The retaining plate 240 may include detents 270 formed at or near a periphery thereof, and extending toward the line lock cover 250. The detents 270 may be spaced apart from each other by a distance that is about double the spacing between adjacent extrusions 252. Moreover, the detents 270 may be sized to fit within the catch space 254 formed in each of the extrusions 242. Thus, sliding one of the extrusions 252 over a detent 270 may result in the detent 270 being caught or held in the corresponding catch space 254. However, applying pressure to the line lock cover 250 may overcome the holding force of the detent 270 in the catch space 254, and the line lock cover 250 may be allowed to rotate again in the opposite direction.

The detents 270 and extrusions 254 may therefore be formed (along with the post 262 and movement limiting post 264) to limit the range of motion of the line lock cover 250 to correspond to the needed range of motion for shifting between the locked and unlocked states of the line lock assembly 190. As such, for example, two extrusions 252 may be disposed spaced apart from each other by an angular distance about equal to the angular distance between the locked state marking 253 and the unlocked state marking 255 at one side of the retaining plate 240. Two other extrusions 252 may be disposed spaced apart from each other by the same distance at the opposite side of the retaining plate 240. Meanwhile, pairs of detents 270 may correspond to each of the groups of two extrusions 252, but may be spaced apart from each other by about twice the distance that separates the extrusions 252. Thus, when the line lock cover 250 is rotated such that the state indicator 251 is moved to point to or align with the locked state marking 253 from prior alignment with the unlocked state marking 255, one of each of the two pairs of extrusions 252 may engage a corresponding one of the detents 270. When the line lock cover 250 is rotated in the opposite direction (i.e., such that the state indicator 251 is moved to point to or align with the unlocked state marking 255 from prior alignment with the locked state marking 253), the opposite one of each of the two pairs of extrusions 252 may engage an opposite one of the detents 270. This change is shown in reference to FIGS. 9A and 9B.

In this regard, FIG. 9A illustrates the lock lever 260 in the locked state where, on the front side of the line lock cover 250, the state indicator 251 would align with the locked state marking 253. The position of the detents 270 is shown as a solid or filled circle to illustrate their alignment with corresponding ones of the extrusions 252 (and more specifically with the catch spaces 254 of each respective extrusion 252). In the locked state, the detents 270 at the top of the retaining plate 240 are spaced apart from each other by about double the distance between the extrusions 252 at the top of the line lock cover 250. However, only the extrusion 252 shown on the top left is aligned with the corresponding detent 270 on the left. The extrusion 252 on the top right is in contact with the lock lever 260 and pushes the lock lever 260 between the spokes 230 of the hub 134 to lock the hub 134. At the bottom of the retaining plate 240, the detents 270 are also spaced apart from each other by about double the distance between the extrusions 252 at the bottom of the line lock cover 250. However, only the extrusion 252 shown on bottom right is aligned with the corresponding detent 270 on the bottom right. The extrusion 252 on the bottom left is about half way to the detent 270 on the bottom left.

When the line lock cover 250 is rotated to make the state indicator 251 align with the unlocked state (a counter clockwise turn of the line lock cover 250 of FIG. 2), the line lock cover 250 as viewed from the opposite perspective shown in FIG. 9B appears to rotate clockwise. The extrusions 252 are therefore also rotated clockwise and continue to move until the top left extrusion 252 (which had previously engaged the top left detent 270) moves to contact and then rotate the line lock lever 260 until it no longer engages or is disposed between spokes 230 of the hub 134. The hub 134 is therefore permitted to turn. The movement of the extrusions 252 in the clockwise direction also results in the right extrusion 252 engaging the top right detent 270 to facilitate holding the line lock cover 250 in this position. Similarly, the bottom right extrusion 252 releases the bottom right detent 270 and rotates until the bottom left extrusion 252 engages the bottom left detent 270. In each case, the engagement of two detents 270 with two extrusions 252 (by catching the detents 270 in the corresponding catch spaces 254 of the respective extrusions 252) creates a frictional force that is sufficient to hold the line lock cover 250 in place, but is easily overcome by the user to change between the locked and unlocked states.

In an example embodiment, a chalk box is provided. The chalk box may include a housing having an aperture, a reel assembly enclosed within the housing, a string, a chalk reservoir and a line lock assembly. The string may have a first end operably coupled to an end hook and configured to extend from the housing through the aperture and may have a second end operably coupled to the reel assembly. The chalk reservoir may be a space in which the string is retained or through which the string passes prior to extending out of the aperture. The retraction assembly may be configured to interface with the reel assembly to enable the string, after extension from the housing, to be wound on the reel assembly responsive to operation of the retraction assembly. The line lock assembly may be configured to lock the retraction assembly to prevent winding or unwinding of the string. The line lock assembly may include a line lock member disposed in a line lock member enclosure.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the line lock member enclosure may fully enclose the line lock member to prevent viewing or touching of the line lock member by a user. In some cases, the retraction assembly may include a hub, and the line lock member may engage the hub to prevent movement of the hub when the retraction assembly is locked. In an example embodiment, the hub may include spokes that extend parallel to an axis of the reel assembly and toward the reel assembly, and the line lock member may move into contact with one or more of the spokes when the retraction assembly is locked, and may move out of contact with the one or more spokes when the retraction assembly is unlocked. In some cases, the line lock member enclosure may be formed between a retaining plate and a line lock cover. In an example embodiment, the line lock cover may be operably coupled to the housing to enable rotation of the line lock cover relative to the housing to move the line lock member to alternately lock the retraction assembly and unlock the retraction assembly based on a position of the line lock cover. In some cases, the line lock cover may include a first pair of extrusions that extend from the line lock cover toward the retaining plate through the line lock member enclosure. In an example embodiment, the retaining plate may include a first pair of detents that extend substantially perpendicular to a surface of the retaining plate and toward the line lock cover. In some cases, the first pair of extrusions may slide across a surface of the retaining plate to define a range of motion for the line lock cover between a locked position and an unlocked position. In an example embodiment, a first extrusion of the first pair of extrusions may engage a first one of the first pair of detents in the locked position, and a second extrusion of the first pair of extrusions may engage the line lock member to move the line lock member into a position to lock the retraction assembly. In some cases, the second extrusion of the first pair of extrusions may engage a second one of the first pair of detents in the unlocked position, and the first extrusion of the first pair of extrusions may engage the line lock member to move the line lock member into a position to unlock the retraction assembly. In an example embodiment, the retaining plate further may include a second pair of detents and the line lock cover may include a second pair of extrusions that extend from the line lock cover toward the retaining plate through the line lock enclosure. In some cases, a first extrusion of the second pair of extrusions may engage a first one of the second pair of detents in the locked position, and a second extrusion of the second pair of extrusions may engage a second one of the second pair of detents in the unlocked position. In an example embodiment, the line lock cover may include a state indicator configured to align with a locked state marking and an unlocked state marking disposed on the housing corresponding to the locked state position and the unlocked state position, respectively. In some cases, the range of motion for the line lock cover may be defined by a distance between the first pair of extrusions. In an example embodiment, each extrusion of the first pair of extrusion may include a catch space oriented to face the retaining plate, and a size of the catch space may be configured to substantially match a size of each detent of the first pair of detents. In some cases, the line lock member enclosure may be formed proximate to a line lock cover, and the line lock cover may be configured to interface with the line lock member to alternately lock and unlock the line lock assembly. In an example embodiment, the line lock member may include a line lock lever.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A chalk box comprising:

a housing having an aperture;

a line lock cover operably coupled to the housing;

a reel assembly enclosed within the housing;

a string having a first end operably coupled to an end hook and configured to extend from the housing through the aperture and having a second end operably coupled to the reel assembly;

a chalk reservoir in which the string is retained or through which the string passes prior to extending out of the aperture;

a retraction assembly configured to interface with the reel assembly to enable the string, after extension from the housing, to be wound on the reel assembly responsive to operation of the retraction assembly; and a line lock assembly configured to lock the retraction assembly to prevent winding or unwinding of the string, wherein the line lock assembly comprises a line lock member disposed in a line lock member enclosure, wherein rotation of the line lock cover, relative to the line lock member, rotates the line lock member to, based on a position of the line lock cover, lock the retraction assembly to prevent winding and unwinding of the string or unlock the retraction assembly to permit winding and unwinding of the string.

2. The chalk box of claim 1, wherein the retraction assembly comprises a hub, and wherein the line lock member engages the hub to prevent movement of the hub when the retraction assembly is locked.

3. The chalk box of claim 2, wherein the hub comprises spokes that extend parallel to an axis of the reel assembly and toward the reel assembly, and wherein the line lock member moves into contact with one or more of the spokes when the retraction assembly is locked, and moves out of contact with the one or more spokes when the retraction assembly is unlocked.

4. A chalk box comprising:

a housing having an aperture;

a reel assembly enclosed within the housing;

a string having a first end operably coupled to an end hook and configured to extend from the housing through the aperture and having a second end operably coupled to the reel assembly;

a chalk reservoir in which the string is retained or through which the string passes prior to extending out of the aperture;

a retraction assembly configured to interface with the reel assembly to enable the string, after extension from the housing, to be wound on the reel assembly responsive to operation of the retraction assembly; and a line lock assembly configured to lock the retraction assembly to prevent winding or unwinding of the string, wherein the line lock assembly comprises a line lock member disposed in a line lock member enclosure, wherein the line lock member enclosure is formed between a retaining plate and a line lock cover, wherein the line lock cover is operably coupled to the housing to enable rotation of the line lock cover relative to the housing to move the line lock member to alternately lock the retraction assembly and unlock the retraction assembly based on a position of the line lock cover;

wherein the line lock cover includes a first pair of extrusions that extend from the line lock cover toward the retaining plate through the line lock member enclosure.

5. The chalk box of claim 4, wherein the retaining plate includes a first pair of detents that extend substantially perpendicular to a surface of the retaining plate and toward the line lock cover.

6. The chalk box of claim 5, wherein the first pair of extrusions slide across a surface of the retaining plate to define a range of motion for the line lock cover between a locked position and an unlocked position.

7. The chalk box of claim 6, wherein a first extrusion of the first pair of extrusions engages a first one of the first pair of detents in the locked position, and a second extrusion of the first pair of extrusions engages the line lock member to move the line lock member into a position to lock the retraction assembly.

8. The chalk box of claim 7, wherein the second extrusion of the first pair of extrusions engages a second one of the first pair of detents in the unlocked position, and the first extrusion of the first pair of extrusions engages the line lock member to move the line lock member into a position to unlock the retraction assembly.

9. The chalk box of claim 8, wherein the retaining plate further comprises a second pair of detents and the line lock cover includes a second pair of extrusions that extend from the line lock cover toward the retaining plate through the line lock enclosure.

10. The chalk box of claim 9, wherein a first extrusion of the second pair of extrusions engages a first one of the second pair of detents in the locked position, and a second extrusion of the second pair of extrusions engages a second one of the second pair of detents in the unlocked position.

11. The chalk box of claim 6, wherein the line lock cover comprises a state indicator configured to align with a locked state marking and an unlocked state marking disposed on the housing corresponding to the locked state position and the unlocked state position, respectively.

12. The chalk box of claim 11, wherein the range of motion for the line lock cover is defined by a distance between the first pair of extrusions.

13. The chalk box of claim 6, wherein each extrusion of the first pair of extrusion includes a catch space oriented to face the retaining plate, and wherein a size of the catch space substantially matches a size of each detent of the first pair of detents.

14. A chalk box comprising:

a housing having an aperture;

a reel assembly enclosed within the housing;

a string having a first end operably coupled to an end hook and configured to extend from the housing through the aperture and having a second end operably coupled to a reel of the reel assembly, the reel being rotatable about an axis to wind or unwind the string;

a chalk reservoir in which the string is retained or through which the string passes prior to extending out of the aperture;

a retraction assembly configured to interface with the reel assembly to enable the string, after extension from the housing, to be wound on the reel assembly responsive to operation of the retraction assembly; and a line lock assembly configured to lock the retraction assembly to prevent winding or unwinding of the string, wherein the line lock assembly comprises a line lock member disposed in a line lock member enclosure, wherein the line lock member enclosure is formed proximate to a line lock cover, wherein the line lock cover is configured to interface with the line lock member to alternately lock and unlock the line lock assembly, and wherein the line lock member comprises a line lock lever that pivots within a plane that is perpendicular to the axis of the reel to alternately lock and unlock the line lock assembly.

15. A chalk box comprising:

a retraction assembly; and a line lock assembly comprising:

a line lock cover operably coupled to a housing of the chalk box to form a line lock member enclosure; and a line lock member disposed within the line lock member enclosure, wherein the line lock member is configured to move responsive to rotation of the line lock cover to alternately lock the retraction assembly and unlock the retraction assembly based on a position of the line lock cover.

16. The line lock assembly of claim 15, wherein the retraction assembly comprises a hub, and wherein the line lock member engages the hub to prevent movement of the hub when the retraction assembly is locked.

17. The line lock assembly of claim 16, wherein the hub comprises spokes that extend parallel to an axis chalk box and into the line lock member enclosure, and wherein the line lock member moves into contact with one or more of the spokes when the retraction assembly is locked, and moves out of contact with the one or more spokes when the retraction assembly is unlocked.

* * * * *